(12) United States Patent
Tang et al.

(10) Patent No.: US 10,067,408 B2
(45) Date of Patent: Sep. 4, 2018

(54) IMAGE CAPTURING MODULE

(71) Applicant: SZ DJI TECHNOLOGY CO., LTD., Shenzhen (CN)

(72) Inventors: Yin Tang, Shenzhen (CN); Hualiang Qiu, Shenzhen (CN); Feihu Yang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/414,675

(22) Filed: Jan. 25, 2017

(65) Prior Publication Data

US 2017/0131621 A1  May 11, 2017

Related U.S. Application Data

(63) Continuation of application No. PCT/CN2014/085588, filed on Aug. 29, 2014.

(51) Int. Cl.
| | |
|---|---|
| G03B 17/02 | (2006.01) |
| G03B 17/55 | (2006.01) |
| G03B 17/56 | (2006.01) |
| H04N 5/225 | (2006.01) |
| G03B 15/00 | (2006.01) |
| B64D 47/08 | (2006.01) |

(52) U.S. Cl.
CPC ............ *G03B 17/02* (2013.01); *B64D 47/08* (2013.01); *G03B 15/006* (2013.01); *G03B 17/55* (2013.01); *G03B 17/561* (2013.01); *H04N 5/2257* (2013.01)

(58) Field of Classification Search
CPC ...... G03B 17/02; G03B 17/55; G03B 17/561; G03B 15/006; B64D 47/08; H04N 5/2257
See application file for complete search history.

(56) References Cited

U.S. PATENT DOCUMENTS

| | | | |
|---|---|---|---|
| 5,864,365 A | 1/1999 | Sramek et al. | |
| 2006/0216996 A1 | 9/2006 | Chen | |
| 2009/0002549 A1 | 1/2009 | Kobayashi | |

(Continued)

FOREIGN PATENT DOCUMENTS

| | | |
|---|---|---|
| CN | 1873523 A | 12/2006 |
| CN | 103631072 A | 3/2014 |
| EP | 1722269 A1 | 11/2006 |

(Continued)

OTHER PUBLICATIONS

The World Intellectual Property Organization (WIPO) International Search Report for PCT/CN2014/085588 dated May 28, 2015 p. 1-5.

(Continued)

*Primary Examiner* — Christopher Mahoney
(74) *Attorney, Agent, or Firm* — Anova Law Group, PLLC

(57) ABSTRACT

An image capturing module including a casing, a camera unit disposed in the casing, a circuit board device connected to the camera unit and disposed in the casing, and a heat dissipation device. The circuit board device includes a circuit board unit disposed at a periphery of the camera unit and including a functional module. The heat dissipation device includes a heat sink attached on a surface of the functional module for dissipating heat from the functional module.

17 Claims, 6 Drawing Sheets

(56) References Cited

U.S. PATENT DOCUMENTS

2014/0055667 A1* 2/2014 Kawamura .......... H04N 5/2252
348/373

FOREIGN PATENT DOCUMENTS

| | | |
|---|---|---|
| EP | 2107797 A1 | 10/2009 |
| JP | H07264450 A | 10/1995 |
| JP | H114354 A | 1/1999 |
| JP | H11355623 A | 12/1999 |
| JP | 2002154491 A | 5/2002 |
| JP | 2007172076 A | 7/2007 |
| JP | 2009135828 A | 6/2009 |
| JP | 2009151037 A | 7/2009 |
| JP | 2009206951 A | 9/2009 |
| JP | 2009246884 A | 10/2009 |
| JP | 2012231214 A | 11/2012 |
| JP | 2014045343 A | 3/2014 |

OTHER PUBLICATIONS

The European Patent Office (EPO) The Extended European Search Report for 14900797.3 dated Jun. 7, 2017 7 Pages.

* cited by examiner

IMAGE CAPTURING MODULE

CROSS-REFERENCE TO RELATED APPLICATION

This is a continuation application of International Application No. PCT/CN2014/085588, filed on Aug. 29, 2014, the entire contents of which are incorporated herein by reference.

TECHNICAL FIELD

The present disclosure relates to the field of image capturing and, in particular, to an image capturing module for aerial photography.

BACKGROUND

Many image capturing modules, for example, cameras, surveillance cameras, and the like, have a trend of becoming more compact and miniaturized. A conventional image capturing module usually includes a lens module for obtaining an optical image and a circuit board coupled to the lens module. The circuit board includes a plurality of functional modules for implementing different functions, such as a photoelectric converting module, an image processing module, an image transmitting module, a power supply module, a control module, and the like. The functional modules usually generate heat during operation. Since a volume of the image capturing module is limited, the functional modules need to be integrated within a small and closed space of the image capturing module. Therefore, the heat generated by the functional modules is difficult to be dissipated effectively and timely. If the heat is accumulated to a certain extent, the performance of the functional modules will be impacted, and the overall performance of the image capturing module will be impacted. A damage to the image capturing module can also occur in severe cases.

SUMMARY

In view of this, it is needed to provide an image capturing module capable of dissipating heat effectively.

In accordance with the present disclosure, there is provided an image capturing module including a casing, a camera unit disposed in the casing, a circuit board device connected to the camera unit and disposed in the casing, and a heat dissipation device. The circuit board device includes a circuit board unit disposed at a periphery of the camera unit and including a functional module. The heat dissipation device includes a heat sink attached on a surface of the functional module for dissipating heat from the functional module.

In some embodiments, the image capturing module further includes a support frame having a hollow frame-shaped structure with a receiving portion formed inside. The camera unit is received in the receiving portion, and the circuit board unit is disposed at a side portion of the support frame.

In some embodiments, the casing includes a first housing body, a second housing body connected to the first housing, a front enclosure, and a back enclosure. The first housing body, the second housing body, the front enclosure, and the back enclosure jointly encloses a receiving space for receiving the camera unit, the circuit board device, and the heat dissipation device.

In some embodiments, the casing includes a first hole corresponding to the front enclosure and in communication with the receiving space and a second hole corresponding to the back enclosure and in communication with the receiving space. The front enclosure is disposed at a position of the first hole and closes the first hole. The back enclosure is disposed at a position of the second hole and closes the second hole.

In some embodiments, the casing includes a first snap portion formed at a periphery of the first hole and a second snap portion formed at a periphery of the second hole. The front enclosure includes a third snap portion corresponding to the first snap portion. The back enclosure includes a fourth snap portion corresponding to the second snap portion. The front enclosure is connected to the casing through the first snap portion and the third snap portion, and the back enclosure is connected to the casing through the second snap portion and the fourth snap portion.

In some embodiments, the first snap portion and the second snap portion each includes a snap groove configuration. The third snap portion includes a first sheet-like protrusion protruding from a side edge of the front enclosure. The fourth snap portion includes a second sheet-like protrusion protruding from the back enclosure.

In some embodiments, the first hole and the second hole are provided at a joint of the first housing body and the second housing body.

In some embodiments, the first hole and the second hole include circular holes, and a line connecting circle centers of the first hole and the second hole is located on an optical axis of the camera unit.

In some embodiments, the first housing body includes a plurality of first connecting portions formed on an inner wall of the first housing body. The second housing body includes a plurality of second connecting portions formed on an inner wall of the second housing body. Each of the second connection portions is aligned with one of the second connecting portions. The first housing body and the second housing body are fixedly connected to each other through the first connecting portions and the second connecting portions.

In some embodiments, the first connecting portions and the second connecting portions include pillars each having an internally threaded hole.

In some embodiments, each of the second connecting portions penetrates through an outer surface of the second housing body to form a corresponding opening on the second housing body.

In some embodiments, the casing further includes a ventilating window in communication with the receiving space and for ventilating the receiving space.

In some embodiments, the ventilating window is formed at a position on the casing close to the front enclosure.

In some embodiments, the ventilating window includes a first opening portion and a second opening portion connected to the first opening portion. The second opening portion is arranged farther away from the front enclosure than the first opening portion. The second opening portion includes an opening inclined relative to an optical axis of the camera unit and oriented towards the front enclosure.

In some embodiments, a profile of the second opening portion is in a shape of an arc. A top of the arc is further away from the optical axis of the camera unit than a bottom of the arc.

In some embodiments, the ventilating window is a first ventilating window. The back enclosure includes a second ventilating window in communication with the receiving space.

In some embodiments, the second ventilating window includes a plurality of arced holes, a plurality of square holes, and a circular hole. The circular hole is formed at a central position of the back enclosure, and the arced holes and the square holes are formed surrounding the circular hole.

In some embodiments, the circular hole and the square holes are disposed spaced apart from each other.

In some embodiments, the circuit board unit includes a first rigid board, a second rigid board, a third rigid board, and a fourth rigid board, a plurality of flexible boards connecting the first, second, third, and fourth rigid boards, and a plurality of functional modules each arranged on one of the rigid boards. The first, second, third, and fourth rigid boards are disposed on different side portions of the camera unit by bending the flexible boards. The second rigid board is disposed on a side of the camera unit facing the first ventilating window. The fourth rigid board is disposed on a side of the camera unit facing the second ventilating window.

In some embodiments, the functional module on the second rigid board includes a central processor.

In some embodiments, the functional module on the fourth rigid board includes an image processor.

In some embodiments, the heat sink is a first heat sink disposed on the second rigid board and connected to the functional module on the second rigid board. The heat dissipation device further includes a second heat sink disposed on the fourth rigid board and connected to the functional module on the fourth rigid board.

In some embodiments, the image capturing module further includes heat conduction fillers filled between the first heat sink and the functional module on the second rigid board, and between the second heat sink and the functional module on the fourth rigid board.

In some embodiments, the heat conduction fillers include heat conduction gels.

In some embodiments, a material of the first heat sink and the second heat sink includes copper or aluminum.

In some embodiments, a material of the first heat sink and the second heat sink includes ceramic.

In some embodiments, the first heat sink includes a base and a plurality of heat dissipation fins formed on the base. The base is connected to the functional module on the second rigid board.

In some embodiments, the plurality of heat dissipation fins are arranged parallel to each other on the base, and an extending direction of each of the heat dissipation fins is parallel to an optical axis of the camera unit.

In some embodiments, the base and the heat dissipation fins are a first base and first heat dissipation fins, respectively. The second heat sink includes a second base and a plurality of second heat dissipation fins formed on the second base. The second base is connected to the functional module on the fourth rigid board.

In some embodiments, the plurality of second heat dissipation fins are arranged parallel to each other on the second base. The second heat dissipation fins are parallel to the first heat dissipation fins and an extending direction of each of the second heat dissipation fins is perpendicular to the optical axis of the camera unit.

In some embodiments, the circuit board unit includes a plurality of rigid boards and at least one flexible board connecting the rigid boards. The rigid boards are disposed on different side portions of the camera unit by bending the flexible boards. The functional module is arranged on one of the rigid boards.

In some embodiments, the heat dissipation device further includes a heat dissipation fan connected to the casing and for driving air within the casing to flow.

In some embodiments, the heat dissipation fan includes a fan body and a fixing member. The fixing member fixes the fan body on the basing.

In some embodiments, the heat dissipation fan includes a reinforcing member disposed on the fixing member across a center opening of the fixing member.

Compared to the existing technologies, the image capturing module may dissipate heat of the circuit board device with the heat dissipation device. Therefore, heat accumulation within the image capturing module may be prevented effectively, ensuring the performance of the functional modules and the overall performance of the image capturing module.

REFERENCE NUMBERS OF ELEMENTS

TABLE 1

Figure 1:
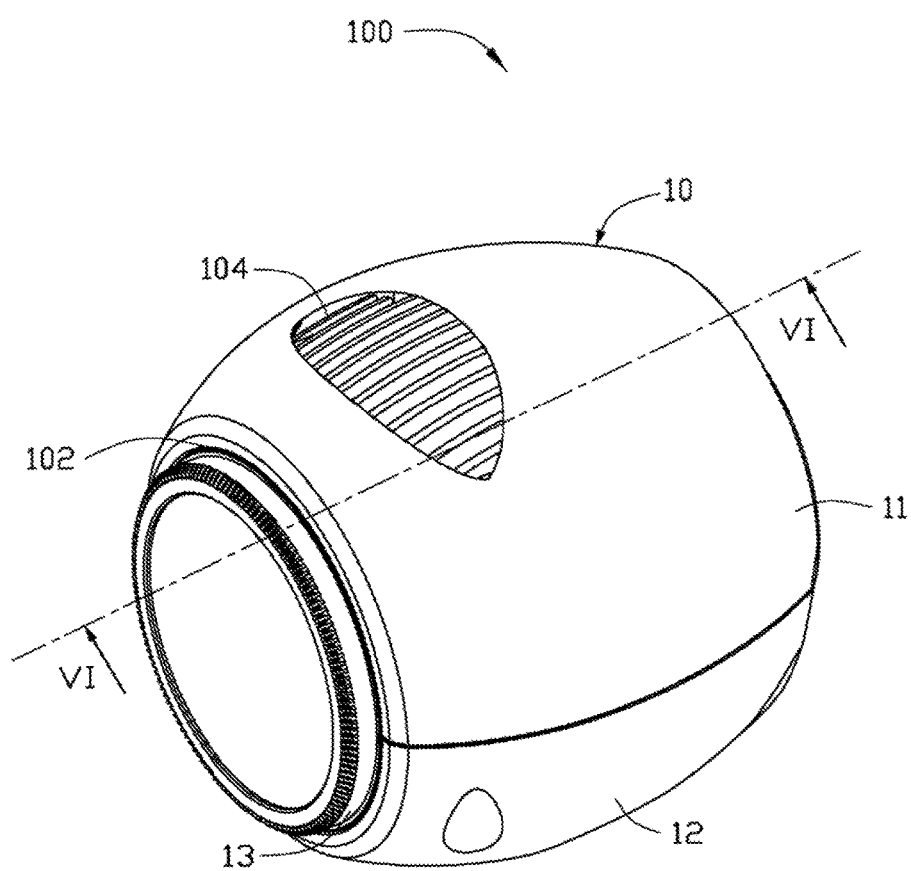
FIG. 1 is a perspective view of an image capturing module in accordance with an embodiment of the present disclosure.
Figure 2:
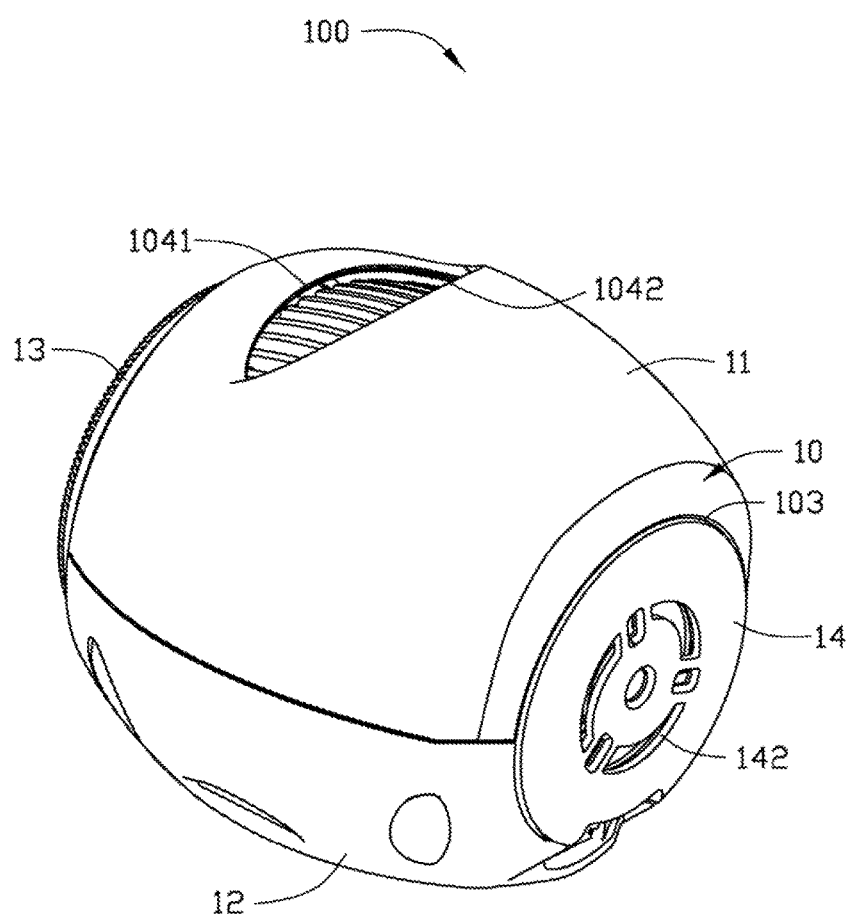
FIG. 2 is a view of the image capturing module of FIG. 1 from another angle.

| | |
|---|---|
| image capturing module | 100 |
| casing | 10 |
| receiving space | 101 |
| first hole | 102 |
| second hole | 103 |
| first ventilating window | 104 |
| first opening portion | 1041 |
| second opening portion | 1042 |
| first housing body | 11 |
| first connecting portion | 111 |
| second connecting portion | 121 |
| opening | 1211 |
| third connecting portion | 122 |
| second housing body | 12 |
| front enclosure | 13 |
| third snap portion | 131 |
| back enclosure | 14 |
| fourth snap portion | 141 |
| second ventilating window | 142 |
| arced hole | 1421 |
| square hole | 1422 |
| circular hole | 1423 |
| first connecting post | 143 |
| second connecting post | 144 |
| first snap portion | 15 |
| second snap portion | 16 |
| mounting portion | 17 |
| camera unit | 20 |
| optical lens | 21 |
| image sensing module | 22 |
| circuit board device | 30 |
| circuit board unit | 31 |
| rigid board | 311 |
| functional module | 3111 |
| first rigid board | 311a |

TABLE 1-continued

| | |
|---|---|
| second rigid board | 311b |
| third rigid board | 311c |
| fourth rigid board | 311d |
| flexible board | 312 |
| support frame | 32 |
| receiving portion | 320 |
| fourth connecting portion | 321 |
| connecting hole | 3211 |
| heat dissipation device | 40 |
| first heat sink | 41 |
| first base | 411 |
| first heat dissipation fin | 412 |
| second heat sink | 42 |
| second base | 421 |
| second heat dissipation fin | 422 |
| heat dissipation fan | 43 |
| fan body | 431 |
| connecting hole | 4311 |
| fixing member | 432 |
| central opening | 4321 |
| first through hole | 4322 |
| second through hole | 4323 |
| reinforcing member | 433 |
| third through hole | 4331 |
| fastener | 50, 80 |
| heat conduction filler | 60, 70 |

Embodiments consistent with the disclosure will be described in detail below in conjunction with the drawings.

DETAILED DESCRIPTION OF EMBODIMENTS

Referring to FIGS. 1-6, an image capturing module 100 in accordance with an embodiment of the present disclosure includes a casing 10, a camera unit 20 disposed in the casing 10, a circuit board device 30, and a heat dissipation device 40. In some embodiments, the image capturing module 100 may be a photographic device used for aerial photography, which can be controlled remotely to perform an aerial photography and can transmit a captured image wirelessly to a receiving device on the ground (not shown).

The casing 10 includes a first housing body 11, a second housing body 12 connected to the first housing body 11, a front enclosure 13, and a back enclosure 14. The first housing body 11, the second housing body 12, the front enclosure 13, and the back enclosure 14 jointly enclose a receiving space 101 for receiving the camera unit 20 and the circuit board device 30. In some embodiments, the casing 10 including the first housing body 11, the second housing body 12, the front enclosure 13, and the back enclosure 14 is approximately in a spherical shape. Of course, the casing 10 can also be in another shape, such as a cuboidal shape, a pyramidal shape, or another polyhedral shape.

The casing 10 has a first hole 102 corresponding to the front enclosure 13 and a second hole 103 corresponding to the back enclosure 14. Both the first hole 102 and the second hole 103 are in communication with the receiving space 101. The first hole 102 and the second hole 103 are located on two opposite sides of the casing 10, respectively. In some embodiments, both the first hole 102 and the second hole 103 are provided at a joint of the first housing body 11 and the second housing body 12. That is, a portion of the first hole 102 is provided on the first housing body 11 and another portion of the first hole 102 is provided on the second housing body 12. A portion of the second hole 103 is provided on the first housing body 11 and another portion of the second hole 103 is provided on the second housing body 12. In some embodiments, the first hole 102 can be provided only on the first housing body 11 or on the second housing body 12. In some embodiments, the second hole 103 can be provided only on the first housing body 11 or on the second housing body 12.

In some embodiments, both the first hole 102 and the second hole 103 are circular holes. A line connecting a circle center of the first hole 102 and a circle center of the second hole 103 is located on an optical axis of the camera unit 20. In other embodiments, the first hole 102 and the second hole 103 can have other shapes.

A plurality of first connecting portions 111 for connecting to the second housing body 12 are formed on an inner wall of the first housing body 11. A plurality of second connecting portions 121 corresponding to the first connecting portions 111 and a plurality of third connecting portions 122 for connecting to the circuit board device 30 are formed on an inner wall of the second housing body 12. The first housing body 11 and the second housing body 12 are connected together through matching between the first connecting portions 111 and the second connecting portions 121. In some embodiments, the first connecting portions 111, the second connecting portions 121, and the third connecting portions 122 include pillars each having an internally threaded hole. Each one of the second connecting portions 121 penetrates through an outer surface of the second housing body 12, forming a corresponding opening 1211.

The casing 10 further includes a mounting portion 17 used for mounting the image capturing module 100 on a carrying apparatus such as a gimbal (not shown). In some embodiments, the mounting portion 17 is formed at a joint of the first housing body 11 and the second housing body 12. That is, a part of the mounting portion 17 is formed on the first housing body 11 and another part of the mounting portion 17 is formed on the second housing body 12. It can be understood that, the mounting portion 17 may be formed entirely on the first housing body 11 or entirely on the second housing body 12.

The casing 10 further includes a first snap portion 1S formed at a periphery of the first hole 102 and a second snap portion 16 formed at a periphery of the second hole 103. In some embodiments, the first snap portion 15 and the second snap portion 16 both have a snap groove configuration. Specifically, the first snap portion 15 includes two snap groove structures that are spaced apart from each other. One of the two snap groove structures is formed on the first housing body 11 and the other one of the two snap groove structures is formed on the second housing body 12. The second snap portion 16 has a configuration similar to that of the first snap portion 15, and detailed description thereof is omitted.

The casing 10 further includes a first ventilating window 104 in communication with the receiving space 101. The first ventilating window 104 is formed at a position on the spherical casing 10 that is close to the front enclosure 13. The first ventilating window 104 includes a first opening portion 1041 close to the front enclosure 13 and a second opening portion 1042 away from the front enclosure 13 and connected to the first opening portion 1041. The second opening portion 1042 is inclined relative to the line connecting the circle centers of the first hole 102 and the second hole 103, and faces towards the front enclosure 13. A profile of the second opening portion 1042 is approximately in a shape of an arc. A top of the arc is positioned away from the line connecting the circle centers of the first hole 102 and the second hole 103.

In the example shown in the drawings, the first ventilating window 104 is formed on the first housing body 11. It can be understood that, a position of the first ventilating window 104 may vary as appropriate. For example, the first ventilating window 104 can be formed on the second housing body 12 or at a border between the first housing body 11 and the second housing body 12.

A shape and a size of the front enclosure 13 and those of the back enclosure 14 correspond to a shape and a size of the first hole 102 and those of the second hole 103, respectively. The front enclosure 13 includes a third snap portion 131 corresponding to the first snap portion 15. The back enclosure 14 includes a fourth snap portion 141 corresponding to the second snap portion 16. In some embodiments, the third snap portion 131 includes a sheet-like protrusion protruding from a side edge of the front enclosure 13. The fourth snap portion 141 includes a sheet-like protrusion protruding from the back enclosure 14. A second ventilating window 142 in communication with the receiving space 101 is formed on the back enclosure 14. In some embodiments, the second ventilating window 142 includes a plurality of arced holes 1421, a plurality of square holes 1422, and a circular hole 1423. The circular hole 1423 is formed at a central position of the back enclosure 14. The arced holes 1421 and the square holes 1422 are formed surrounding the circular hole 1423. The circular hole 1423 is arranged to be spaced apart from the square holes 1422. A plurality of first connecting posts 143 and a plurality of second connecting posts 144 are formed on the back enclosure 14. In some embodiments, the first connecting posts 143 include pillars each having a threaded hole formed therein.

The camera unit 20 includes an optical lens 21 and an image sensing module 22 arranged at an imaging side of the optical lens 21. The optical lens 21 is configured to acquire an optical image. The image sensing module 22 is configured to sense the optical image acquired by the optical lens 21 and to perform a photoelectric conversion. In some embodiments, the image sensing module 22 includes an image sensing module of a Charge-coupled Device (CCD) type or a Complementary Metal Oxide Semiconductor (CMOS) type.

The circuit board device 30 includes a circuit board unit 31 and a support frame 32. The circuit board unit 31 includes a plurality of rigid boards 311 and a plurality of flexible boards 312 connecting the rigid boards 311. Each one of the rigid boards 311 is provided with a corresponding functional module 3111 thereon. The functional modules 3111 on different rigid boards 311 are configured to implement different functions of the image capturing module 100. In some embodiments, there are four rigid boards 311, i.e., a first rigid board 311a, a second rigid board 311b, a third rigid board 311c, and a fourth rigid board 311d. The second rigid board 311b, the third rigid board 311c, and the fourth rigid board 311d are disposed on different sides of the first rigid board 311a, respectively, and are connected to the first rigid board 311a through one of the flexible boards 312. Specifically, the corresponding functional module 3111 on the second rigid board 311b includes a central processor, and the corresponding functional module 3111 on the fourth rigid board 311d includes an image processor. The central processor and the image processor can generate heat during operation and can be the main heat-generating elements on the circuit board device 30. In addition, the functional modules 3111 on the first rigid board 311a and the third rigid boards 311c can have different functions in accordance with specific requirements. Such functions can be, for example, image transmission, power management, and/or gimbal control.

It can be understood that, the number of the rigid boards 311 can vary in accordance with different actual requirements, and is not limited to that in the present embodiment.

The flexible boards 312 include flexible circuit boards containing bendable circuits therein. Thus, the flexible boards 312 can connect different rigid boards 311 to each other mechanically and electrically. In addition, different rigid boards 311 connected by a flexible board 312 can be bent relative to each other at a predetermined angle.

The support frame 32 is approximately in a shape of a hollow polyhedral frame, with a receiving portion 320 formed inside the frame. In some embodiments, the support frame 32 is substantially in a shape of a hexahedral frame. A plurality of fourth connecting portions 321 corresponding to the third connecting portions 122 are arranged on a periphery of the support frame 32. In some embodiments, each one of the fourth connecting portions 321 includes a sheet-like structure protruding from the periphery of the support frame 32, and includes a connecting hole 3211.

The heat dissipation device 40 includes a first heat sink 41, a second heat sink 42, and a heat dissipation fan 43. The first heat sink 41 and the second heat sink 42 are made from a material with a good thermal conduction performance. Specifically, the material of the first heat sink 41 and the second heat sink 42 can be a metallic material such as copper or aluminum, or a non-metallic material such as ceramic. The first heat sink 41 includes a first base 411 and a plurality of first heat dissipation fins 412 formed on the first base 411. The plurality of first heat dissipation fins 412 are arranged parallel to each other on the first base 411. The second heat sink 42 has a structure similar to that of the first heat sink 41, and includes a second base 421 and a plurality of second heat dissipation fins 422 formed on the second base 421. The plurality of second heat dissipation fins 422 are arranged parallel to each other on the second base 421.

It can be understood that, in addition to the first heat sink 41 and the second heat sink 42, the heat dissipation device 40 can include other similar heat sinks to dissipate heat generated by the circuit board device 30 in different situations.

The heat dissipation fan 43 is configured to facilitate an air movement within the casing 10. The heat dissipation fan 43 includes a fan body 431 and a fixing member 432. A plurality of connecting holes 4311 corresponding to the second connecting posts 144 are formed on the fan body 431. In some embodiments, the fan body 431 is approximately in a square shape and has two connecting holes 4311. The two connecting holes 4311 are located at opposite ends of a diagonal of the fan body 431. The fan body 431 includes blades (not shown) inside the fan body 431 for facilitating air movement. The blades can generate an air flow when rotating. The fixing member 432 is approximately in a flat plate-like structure, and a central opening 4321, a plurality of first through holes 4322 corresponding to the first connecting posts 143, and a plurality of second through holes 4323 corresponding to the second connecting posts 144 are formed on the fixing member 432. The heat dissipation fan 43 further includes a reinforcing member 433. In some embodiments, the reinforcing member 433 is approximately in a long strip shape. A third through hole 4331 is formed at each end of the reinforcing member 433. The reinforcing member 433 is disposed on the fixing member 432 across the central opening 4321. Each one of the third through holes 4331 is aligned with a corresponding second through hole 4323.

Figure 3:
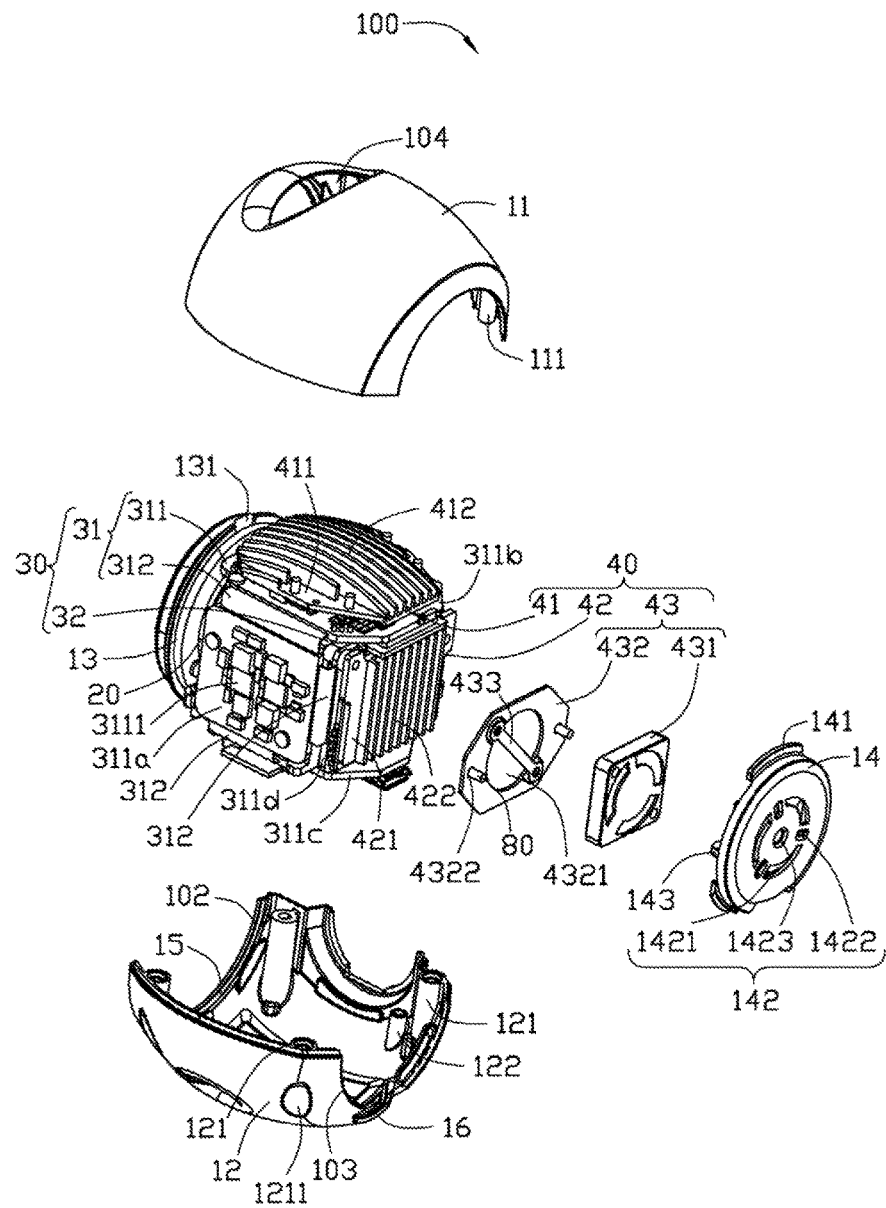
FIG. 3 is an exploded view of the image capturing module of FIG. 2.
Figure 4:
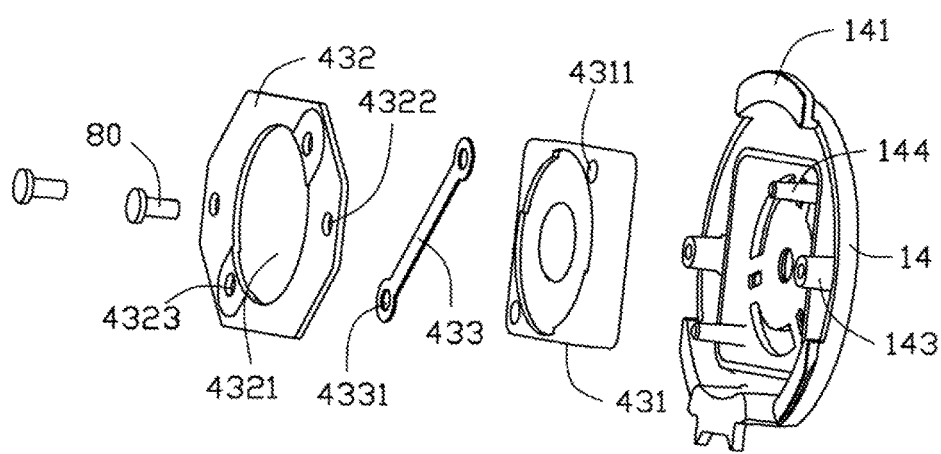
FIG. 4 is a view of a back enclosure and a heat dissipation fan of the image capturing module of FIG. 2 from another angle.
Figure 5:
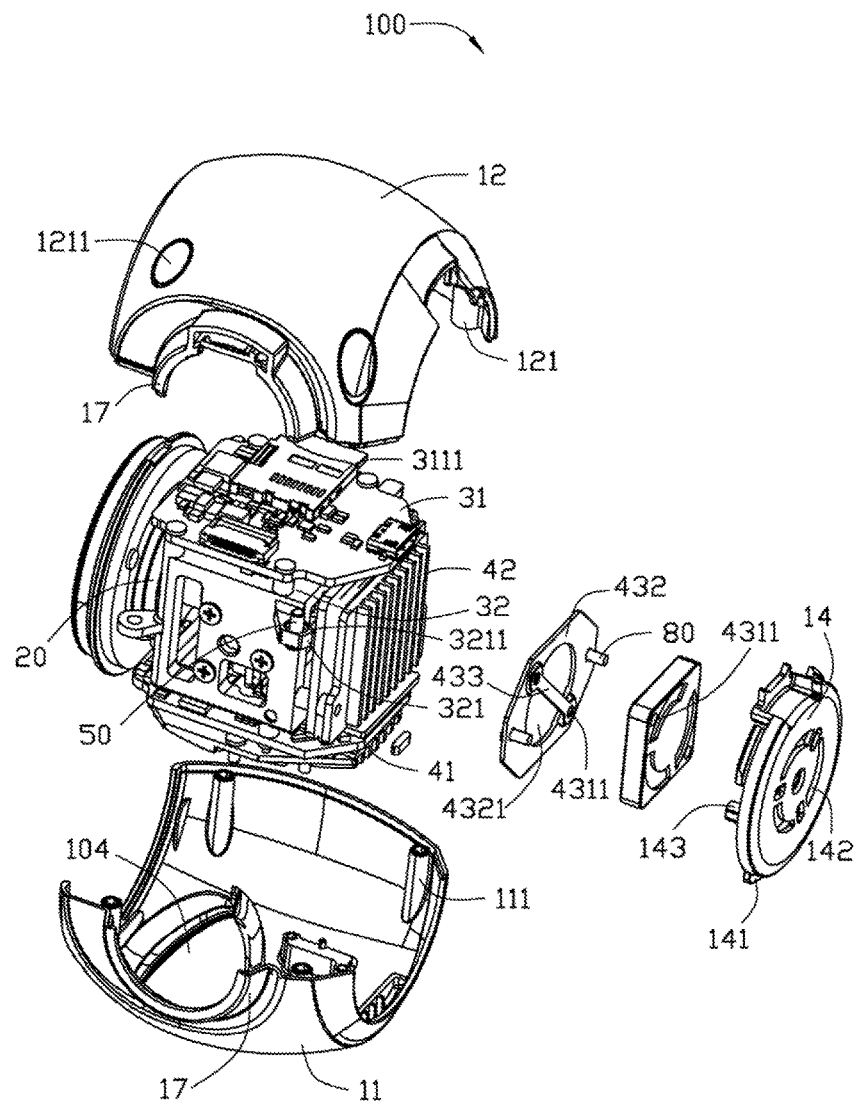
FIG. 5 is a view of the image capturing module of FIG. 3 from another angle.
Figure 6:
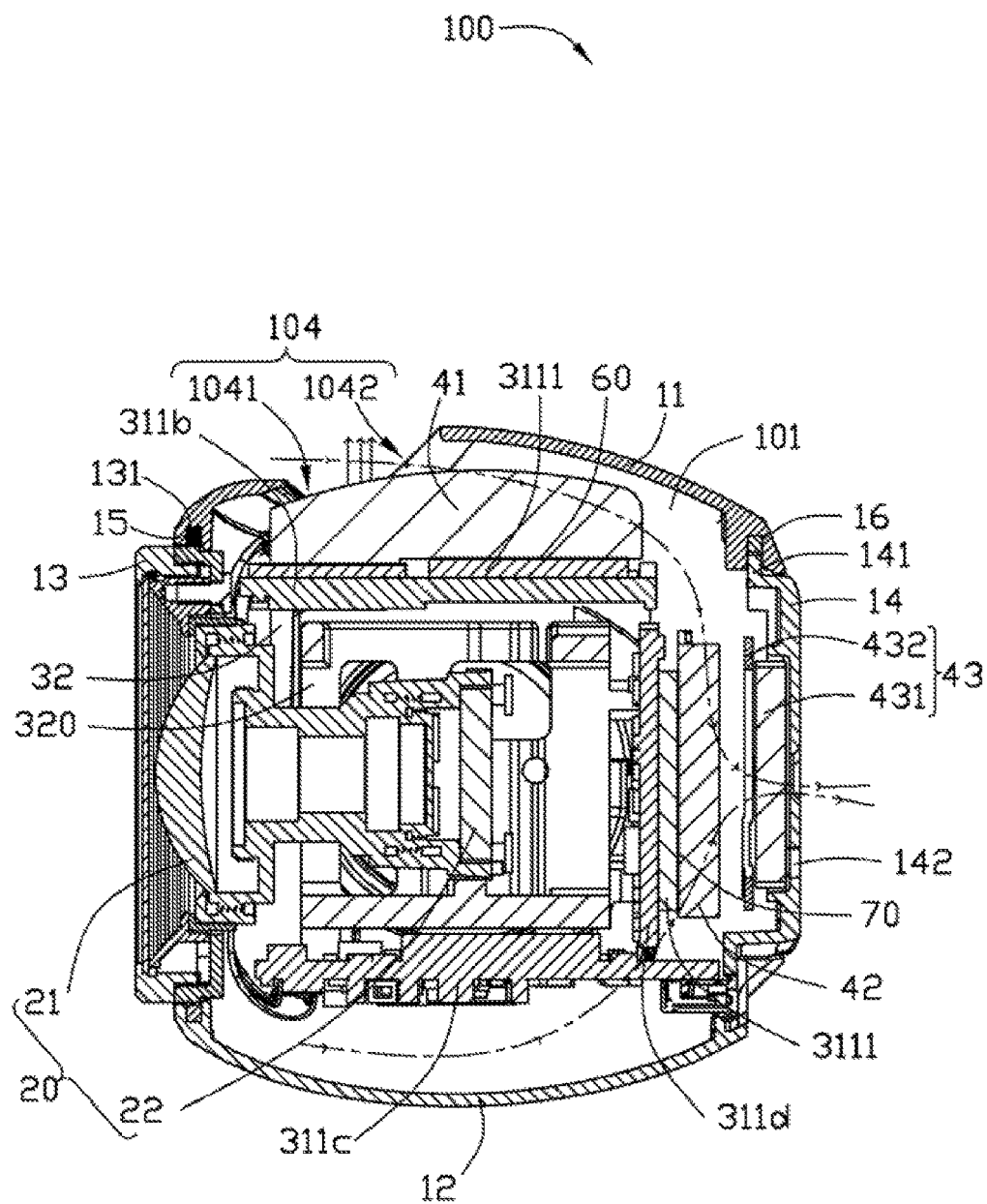
FIG. 6 is a sectional view of the image capturing module of FIG. 2 along line VI-VI.

Referring to FIGS. 3, 5, and 6, during assembly, the camera unit 20 is assembled into the receiving portion 320 of the support frame 32 and fixed on the support frame 32. The rigid boards 311 are disposed on different sides of the support frame 32, respectively. Specifically, the fourth rigid board 311*d* is disposed on a side of the support frame 32 opposite to the optical lens 21 of the camera unit 20.

After the camera unit 20 and the circuit board unit 31 are disposed on the support frame 32, the image sensing module 22 of the camera unit 20 can be electrically coupled to the circuit board unit 31 using a patch cord (not shown).

The first heat sink 41 is disposed on the second rigid board 311*b*. Specifically, the first base 411 is connected to the functional module 3111 of the second rigid board 311*b*. An extending direction of each one of the first heat dissipation fins 412 is parallel to the optical axis of the camera unit 20. In some embodiments, a thermal conduction filler 60 is filled between surfaces of the first base 411 and the functional module 3111 to increase a contact stability and a thermal conduction efficiency between the first base 411 and the functional module 3111. The thermal conduction filler 60 can include a thermal conduction gel. The second heat sink 42 is disposed on the fourth rigid board 311*d*. Specifically, the second base 421 is connected to the functional module 3111 of the fourth rigid board 311*d*. Each one of the second heat dissipation fins 422 is parallel to the first heat dissipation fins 412. An extending direction of each one of the second heat dissipation fins 422 is perpendicular to the optical axis of the camera unit 20. A thermal conduction filler 70 is filled between surfaces of the second base 421 and the functional module 3111.

After the camera unit 20 is assembled with the circuit board device 30, the support frame 32 is disposed within the receiving space 101 of the casing 10. The optical lens 21 is oriented towards the first hole 102. The first heat sink 41 is located at a side of the casing 10 that has the first ventilating window 104. The fourth connecting portions 321 are aligned with respective third connecting portions 122. In some embodiments, each one of the fourth connecting portions 321 and a corresponding connecting portion 122 are connected by a fastener 50, to fix the support frame 32 within the casing 10. The first housing body 11 and the second housing body 12 are snapped together, where the first connecting portions 111 are aligned with respective second connecting portions 121. Thereafter, the first connecting portions 111 and the second connecting portions 121 are connected together using bolts (not shown) inserted in the openings 1211, such that the first housing body 11 and the second housing body 12 are fixedly connected with each other. In addition, the first housing body 11 and the second housing body can, after being snapped together, be further fixed and sealed using glue (not shown) or the like.

The heat dissipation fan 43 is disposed on the back enclosure 14. The fan body 431 is located between the back enclosure 14 and the fixing member 432. The connecting holes 4311 of the fan body 431, the second through holes 4323 of the fixing member 432, and the second connecting posts 144 of the back enclosure 14 are respectively aligned. The first through holes 4322 of the fixing member 432 and the first connecting posts 143 of the back enclosure 14 are respectively aligned. The fixing member 432 is connected to the first connecting posts 143 of the back enclosure 14 through fasteners 80 inserted in the first through holes 4322. Likewise, the fixing member 432 and the fan body 431 are connected to the second connecting posts 144 of the back enclosure 14 through fasteners (not shown) inserted sequentially in the second through holes 4323 and corresponding connecting holes 4311.

The front enclosure 13 closes the first hole 102. The third snap portion 131 and the first snap portion 15 are snapped together. The back enclosure 14 closes the second hole 103. The fourth snap portion 141 and the second snap portion 16 are snapped together.

Referring to FIG. 3 and FIG. 6, when the image capturing module 100 operates, the functional modules 3111 on the circuit board unit 31 may generate heat. The first heat sink 41 dissipates the heat generated by the functional module 3111 on the second rigid board 311*b*. The second heat sink 42 dissipates the heat generated by the functional module 3111 on the fourth rigid board 311*d*. The heat dissipation fan 43 is turned on to draw an air flow into the receiving space 101 of the casing 10 through the first ventilating window 104. The arc-shaped profile of the second opening portion 1042 of the first ventilating window 104 can facilitate the entry of the air flow into the casing 10. Moreover, when the image capturing module 10 is carried by an aerial vehicle (not shown) and moves, even if the heat dissipation fan 43 is not provided, the second opening portion 1042 can still cause the air flow to enter the receiving space 101 and flow to the second ventilating window 142 along the first heat sink 41. Thus, the heat dissipation air flow can be accelerated, and a heat dissipation effect can be improved. The heat dissipation fan 43 causes a portion of the air flow to flow within a space between the first heat sink 41 and the first housing body 11 and towards the second heat sink 42. When passing through the first heat dissipation fins 412, this portion of air flow can take away the heat absorbed by the first heat sink 41. Another portion of the air flow moves within a space between the third rigid board 311*c* and the second housing body 12 and towards the second heat sink 42. When passing through the third rigid board 311*c*, this portion of air flow can take away the heat generated by the corresponding functional module 3111. The heat dissipation fan 43 causes the two portions of air flow to converge at the second heat sink 42 and to take away the heat absorbed by the second heat sink 42. The heat dissipation fan 43 exhausts the air converged at the second heat sink 42 out of the casing 10 of the image capturing module 100 through the second ventilating window 142. In addition, a portion of the heat within the casing 10 can rise to the top of the casing 10 through hot air. Therefore, the first ventilating window 104 provided on the top of the casing 10 can dissipate the heat to the environment as quickly as possible.

The image capturing module 100 utilizes the heat dissipation device 40 to dissipate the heat from the circuit board device 30. As such, heat accumulation within the image capturing module 100 can be prevented effectively, ensuring the performance of the functional modules 3111 and the overall performance of the image capturing module 100.

It can be understood that, those skilled in the art can make a design including other variations within the spirit of the present disclosure, as long as it does not depart from the technical effect of the present disclosure. These variations made according to the spirit of the disclosure shall all fall into the scope of the present disclosure.

What is claimed is:
1. An image capturing module comprising:
   a camera unit;
   a circuit board device connected to the camera unit, the circuit board device comprising:
     a circuit board unit disposed at a periphery of the camera unit and comprising a functional module;
   a heat dissipation device comprising:

a heat sink attached on a surface of the functional module for dissipating heat from the functional module;
a support frame having a hollow frame-shaped structure with a receiving portion formed inside, wherein the camera unit is received in the receiving portion, and the circuit board unit is disposed at a side portion of the support frame; and
a casing, comprising a ventilating window, a first housing body, a second housing body connected to the first housing, a front enclosure, and a back enclosure, wherein the first housing body, the second housing body, the front enclosure, and the back enclosure jointly enclose a receiving space for receiving the camera unit, the circuit board device, and the heat dissipation device; and wherein the ventilating window is in communication with the receiving space and for ventilating the receiving space.

2. The image capturing module of claim 1, wherein:
the casing further includes:
a first hole corresponding to the front enclosure and in communication with the receiving space; and
a second hole corresponding to the back enclosure and in communication with the receiving space,
the front enclosure is disposed at a position of the first hole and closes the first hole, and the back enclosure is disposed at a position of the second hole and closes the second hole.

3. The image capturing module of claim 2, wherein the first hole and the second hole are provided at a joint of the first housing body and the second housing body.

4. The image capturing module of claim 2, wherein the first hole and the second hole include circular holes, and a line connecting circle centers of the first hole and the second hole is located on an optical axis of the camera unit.

5. The image capturing module of claim 1, wherein the ventilating window is formed at a position on the casing close to the front enclosure.

6. The image capturing module of claim 5, wherein the ventilating window comprises:
a first opening portion; and
a second opening portion connected to the first opening portion, the second opening portion being arranged farther away from the front enclosure than the first opening portion, and the second opening portion including an opening inclined relative to an optical axis of the camera unit and oriented towards the front enclosure.

7. The image capturing module of claim 6, wherein a profile of the second opening portion is in a shape of an arc, a top of the arc being further away from the optical axis of the camera unit than a bottom of the arc.

8. The image capturing module of claim 1, wherein:
the ventilating window is a first ventilating window, and
the back enclosure includes a second ventilating window in communication with the receiving space.

9. The image capturing module of claim 8, wherein the second ventilating window comprises a plurality of arced holes, a plurality of square holes, and a circular hole, the circular hole being formed at a central position of the back enclosure, and the arced holes and the square holes being formed surrounding the circular hole.

10. The image capturing module of claim 9, wherein the circular hole and the square holes are disposed spaced apart from each other.

11. The image capturing module of claim 8, wherein:
the circuit board unit comprises:
a first rigid board, a second rigid board, a third rigid board, and a fourth rigid board;
a plurality of flexible boards connecting the first, second, third, and fourth rigid boards; and
a plurality of functional modules each arranged on one of the rigid boards,
the first, second, third, and fourth rigid boards are disposed on different side portions of the camera unit by bending the flexible boards,
the second rigid board is disposed on a side of the camera unit facing the first ventilating window, and
the fourth rigid board is disposed on a side of the camera unit facing the second ventilating window.

12. The image capturing module of claim 11, wherein:
the heat sink is a first heat sink disposed on the second rigid board and connected to the functional module on the second rigid board, and
the heat dissipation device further comprises a second heat sink disposed on the fourth rigid board and connected to the functional module on the fourth rigid board.

13. The image capturing module of claim 12, wherein the first heat sink comprises a base and a plurality of heat dissipation fins formed on the base, the base being connected to the functional module on the second rigid board.

14. The image capturing module of claim 1, wherein:
the circuit board unit comprises a plurality of rigid boards and at least one flexible board connecting the rigid boards,
the rigid boards are disposed on different side portions of the camera unit by bending the flexible boards, and
the functional module is arranged on one of the rigid boards.

15. The image capturing module of claim 1, wherein the heat dissipation device further comprises a heat dissipation fan connected to the casing and for driving air within the casing to flow.

16. The image capturing module of claim 15, wherein the heat dissipation fan comprises a fan body and a fixing member, the fixing member fixing the fan body on the casing.

17. The image capturing module of claim 16, wherein the heat dissipation fan comprises a reinforcing member disposed on the fixing member across a center opening of the fixing member.

* * * * *